(12) United States Patent
Yamagata et al.

(10) Patent No.: US 7,587,913 B2
(45) Date of Patent: Sep. 15, 2009

(54) GLOBULAR GLASS MANUFACTURING APPARATUS AND METHOD FOR MANUFACTURING THE GLOBULAR GLASS

(75) Inventors: Akimasa Yamagata, Sagamihara (JP); Futoshi Ishizaki, Sagamihara (JP); Kenji Sugizaki, Machida (JP)

(73) Assignee: Kabushiki Kaisha Ohara, Sagamihara (JP)

( * ) Notice: Subject to any disclaimer, the term of this patent is extended or adjusted under 35 U.S.C. 154(b) by 183 days.

(21) Appl. No.: 11/015,700

(22) Filed: Dec. 20, 2004

(65) Prior Publication Data

US 2005/0132752 A1    Jun. 23, 2005

(30) Foreign Application Priority Data

Dec. 22, 2003    (JP)    ............... 2003-424939

(51) Int. Cl.
*C03B 17/00*    (2006.01)
*C03B 7/10*    (2006.01)
(52) U.S. Cl. ............... 65/127; 65/126; 65/133
(58) Field of Classification Search ............... None
See application file for complete search history.

(56) References Cited

U.S. PATENT DOCUMENTS 2,963,824 A * 12/1960 Pinotti ............... 65/21.2
3,313,608 A   4/1967 Guyer et al.
5,746,798 A * 5/1998 Menzie ............... 65/29.12
2003/0131628 A1  7/2003 Murakami et al.
2003/1131628     7/2003 Murakami et al.

FOREIGN PATENT DOCUMENTS

| CH | 550 022 A | 6/1974 |
|----|-----------|--------|
| CN | 1438190 A | 8/2003 |
| GB | 844573 A | 12/1960 |
| JP | A 9-235122 | 9/1997 |
| JP | A 2003-104744 | 4/2003 |

* cited by examiner

*Primary Examiner*—Philip C Tucker
*Assistant Examiner*—Michael J Felton
(74) *Attorney, Agent, or Firm*—Oliff & Berridge, PLC (57) ABSTRACT

A globular glass manufacturing apparatus includes: a flow nozzle to flow a molten glass in a form of continuous flow, a collection tank to collect droplet-like glass gobs deformed from the molten glass flowing in a form of continuous flow during fall. Further, the globular glass manufacturing apparatus comprises a gas nozzle to shift one or both of falling trajectories of the glass gobs neighboring above and below by blowing gas to the glass gobs or sucking the glass gobs, wherein the gas nozzle rotates in which the center is on falling trajectory of the glass gobs.

4 Claims, 10 Drawing Sheets

GLOBULAR GLASS MANUFACTURING APPARATUS AND METHOD FOR MANUFACTURING THE GLOBULAR GLASS

BACKGROUND OF THE INVENTION

1. Field of the Invention

The present invention relates to a globular glass manufacturing apparatus and a method for manufacturing the globular glass, for manufacturing a globular glass used for a preform, lens and the like to obtain an optical element by precision mold pressing, such as a lens and prism used as a light pickup lens for DVD, CD and magnet-optical disk (MO), lens for a cell-phone camera, lens for light communication and optical devices, and the like.

2. Description of Related Art

In recent years, in order to reduce manufacturing cost, optical elements such as lens are manufactured with precision mold pressing that a glass preform is heated to be soft and press-molded with a metal die having precise molding surface to obtain optical element such as lens directly in which grinding and polishing steps following to the molding are omitted. A micro globular preform is becoming to be used in manufacturing a micro lens such as, for example, a light pickup lens for such as DVD, lens for a cell-phone camera and optical coupling lens used in optical communication field to couple a photo diode or laser diode with a fiber optics with precision mold pressing. Furthermore, a micro ball lens is sometimes used as the above light coupling lens and the like. Thus, a globular glass having diameter of about 0.8 mm to 2.4 mm is required as the above micro preform, micro globular lens or the like.

It is a general method for mass-producing the preform at low cost that let glass melted in a glass fusion furnace flow from a flow nozzle and the flowing glass is divided and cooled by some method. Here, the following method is known for dividing a glass flowing from the tip of the flow nozzle to manufacture a glass gob having small diameter. That is, let the molten glass melted in the fusion furnace flow from the flow nozzle in a form of continuous flow, and let the continuous flowing molten glass deform to droplet-like glass gobs falling in a line by the action of the surface tension. Then the glass gobs falling in a line is caught into a liquid in a tank to collect the glass gobs used as a preform, lens and the like (for example, see JP Tokukaihei 09-235122A).

In manufacturing a glass gob disclosed in the above JP Tokukaihei 09-235122A, the molten glass flowing in a form of continuous flow is deformed into the droplet-like glass gobs by cutting the molten glass with the surface tension during fall. However, it has been problematic in this process that the two glass gobs neighboring above and below sometimes contact or collide with each other and re-couple to be one glass gobs again, since the two glass gobs pulls each other by the action of the surface tensions so that there occurs a difference in falling speed between the two glass gobs during fall in a line.

Such re-coupled glass gob has various shape according to a temperature and viscosity in the coupling, such that the two glass gobs couple with each other to be one entirely, couples with each other partly, and the like. The obtained glass gobs have various shape are nonuniform in their weight and shape.

Further, even if they re-couple to be one, it sometime has striae internally. Therefore, it is impossible to use it as an optical element.

Further, even when the glass gobs neighboring above and below do not re-couple but contact each other, they sometimes has a flaw on their surface. Thus it is impossible to use them as an optical element.

Therefore, it is required that the glass gobs have to be collected before the glass gobs neighboring above and below re-couple or contact each other. This problem is possibly avoided by shortening falling distance of the glass gobs. However, when the falling distance is short, it is requested to collect the glass gobs having high temperature. Thus, the glass gobs have to be caught into oil or the like at high temperature to collect them in order to avoid generation of a crack caused by thermal shock. Concretely, when the glass gobs having high temperature and low viscosity are caught into oil or the like at high temperature, it s problematic that the obtained glass gob has nonuniform shape due to deformation caused by impact of collision with liquid surface. Further, when the glass gob is caught into oil at high temperature to collect it, the glass gob requires careful wash to use it as a preform or optical element. Thus, it is problematic that the wash takes time and cost and the glass gob is easily damaged in the wash. Further, there is a problem on safety ground that the oil may take fire when the glass gob at high temperature is caught into oil at high temperature.

In the case that the glass gob is used as a preform for precision mold pressing, the preform having nonuniform weight and a internal striae caused by the above-described re-coupling and the like as described above cannot be used as an optical element even if the preform is molded with precision mold pressing. When a preform having nonuniform shape is molded with precision mold pressing, a molded product sometime has a defect that the surface thereof partially cave in (sink mark) and the optical axis deviates because of the uneven thickness of the product. Thus, it sometimes cannot be used as an optical element. When a preform having a flaw is molded with precision mold pressing, defects sometimes occurs, such that the flaw itself or the glass surface around the flaw is fold to be incorporated into the inside of the glass and the glass solidifies as it is (folded ridges) and gas is incorporated into the inside thereof from the flaw to be a micro bubble inside the product. Thus, the product sometimes cannot be used as an optical element.

On the other hand, a method for manufacturing a ball glass is disclosed, in which molten glass kept in a container is ejected to gas phase from an orifice provided to a part of the container so as to form a glass droplet, while vibration is given to the molten glass, and the glass droplet is solidified while the glass droplet is falling in gas phase or liquid phase (for example, see JP Tokukai 2003-104744A).

In the method for manufacturing a ball glass disclosed in the above patent application, vibration is given to the molten glass. A concave portion corresponding to the vibration is formed on a side of a columnar glass droplet which continues from an outlet to decrease the sectional diameter of the columnar glass droplet. According to increase of the falling speed, the columnar glass droplet in which a concave has been formed is separated into droplets having controlled volume at the concave portion formed by the vibration. However, when the columnar glass droplet is separated at the concave portion, there occurs a difference in falling velocity between the separated two glass gobs neighboring above and below caused by the similar reason to the case of the above JP Tokukaihei 09-235122A. When some force (JP Tokukai 2003-104744A does not disclose anything related to the force, but for example, irregular disturbance such as a gas phase convection generated in a collection chamber can be considered) is given to the separated glass droplets so that they have various falling trajectory one another as shown in FIG. 1 of JP Tokukai 2003-104744A, it is comparatively less possible to occur re-coupling of the two glass droplets neighboring above and below and generation of a flaw caused by a contact of the two glass droplets neighboring above and below. However, when such force is not given or is merely given to the falling droplet, the separated glass droplets falls in a line or almost in a line. Thus it is possible to occur re-coupling of the two glass droplets neighboring above and below into one and generation of a flaw caused by a contact of the two glass droplets neighboring above and below caused by the similar reason to the case of the above JP Tokukaihei 09-235122A. In order to avoid these problems, the glass droplets have to be caught into oil at high temperature, which has the similar problem to the method for manufacturing a glass gob disclosed in JP Tokukaihei 09-235122A.

The above JP Tokukai 2003-104744A discloses that the columnar glass droplet is separated to glass droplets of constant volume according to the vibration rate so that the separated glass droplets having uniform volume can be obtained. When a ball glass having diameter larger than the inner diameter of the outlet of the orifice provided to a part of the container is desired, if desired diameter of the glass is slightly larger than the inner diameter of the outlet, it can be obtained by letting a glass droplet have its diameter slightly larger than the inner diameter of the outlet by the action of the surface tension. However, in order to obtain a ball glass having further larger diameter, the container have to be changed to that having larger outlet inner diameter of the orifice, and let glass droplets having larger diameter flow. Therefore, when various ball glasses having considerably different volumes each other are manufactured, several kind of containers having various outlet inner diameter of the orifice have to be prepared. The container which keeps molten optical glass is generally made of platinum in order to obtain an optical glass of high quality. Since such platinum made container is extremely expensive, it is a big economical disadvantage to prepare various kinds of the containers. Further, it is also problematic that an exchange of the container costs labor and time.

According to the technique disclosed in JP Tokukai 2003-104744A, molten glass is ejected from an orifice provided to a part of a container to gas phase so as to form a glass droplet. Thus, once ejection of the molten glass starts, it is difficult to stop the ejection of the molten glass unless the entire molten glass in the container is ejected. Therefore, there is a problem on safety ground since it is difficult to bring the ejection of the molten glass to emergency stop.

SUMMARY OF THE INVENTION

The present invention is accomplished based on the above circumstances. The object of the present invention is to provide a globular glass manufacturing apparatus and a method for manufacturing the globular glass, in which a globular glass having uniform weight and shape can be manufactured and it is possible to collect the manufactured globular glass which is sufficiently cooled.

According to the first aspect of the invention, a globular glass manufacturing apparatus comprises: a flow nozzle to flow a molten glass in a form of continuous flow, a collection tank to collect a droplet-like glass gob deformed from the molten glass flowing in a form of continuous flow during fall, wherein the globular glass manufacturing apparatus further comprises a trajectory shifting member to shift one or both of falling trajectories of the glass gobs neighboring above and below so that the falling trajectories of the glass gobs neighboring above and below are different each other while the glass gob falls.

The trajectory shifting member may comprise a hole to blow gas to one or both of the glass gobs neighboring above and below or to suck one or both of the glass gobs neighboring above and below.

The trajectory shifting member may blow gas to one or both of the glass gobs neighboring above and below or sucks one or both of the glass gobs neighboring above and below, while the trajectory shifting member rotates in which a center is on a falling trajectory of the glass gob.

Figure 1:
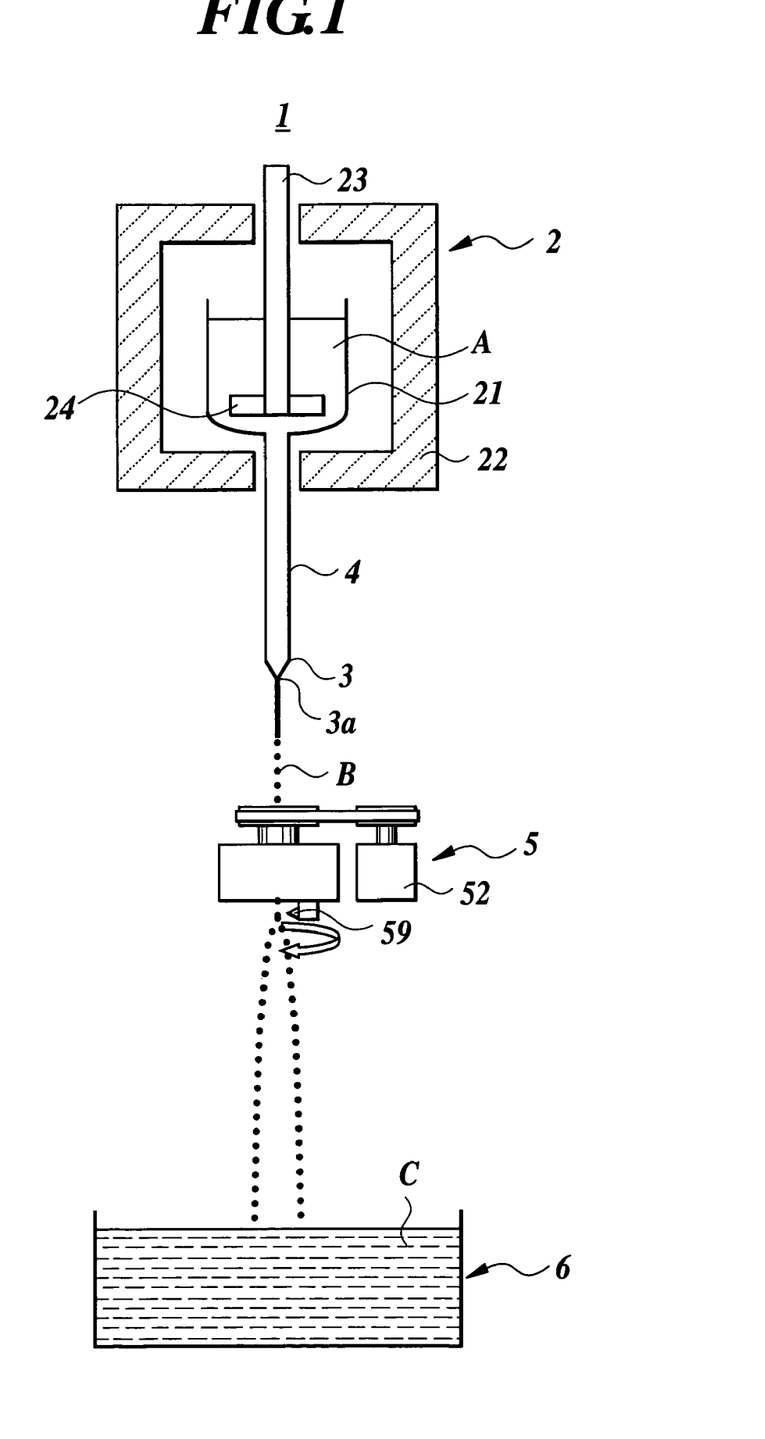
FIG. 1 is a sectional side view showing the globular glass manufacturing apparatus schematically for showing an embodiment of the present invention.
Figure 2:
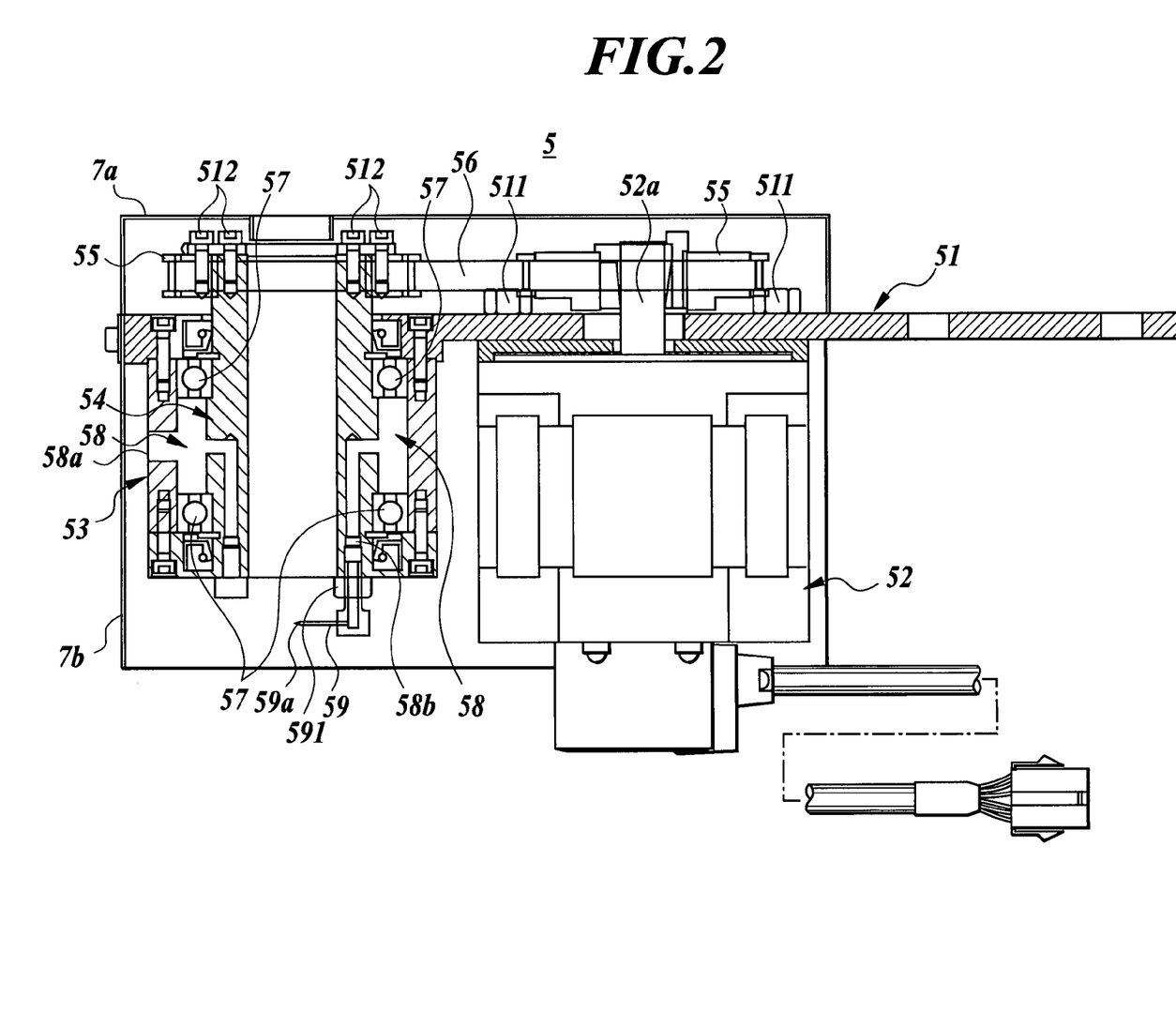
FIG. 2 is a sectional side view of a rotation nozzle section of the globular glass manufacturing apparatus.

For example, as shown in FIG. 1 and FIG. 2, the glass manufacturing apparatus 1 comprises a flow nozzle 3 to flow a molten glass A in a form of continuous flow, a collection tank 6 to collect a droplet-like glass gob B deformed from the molten glass flowing in a form of continuous flow during fall. The globular glass manufacturing apparatus 1 further comprises a gas nozzle 59 to shift one or both of falling trajectories of the glass gobs B neighboring above and below by blowing gas to the glass gobs B neighboring above and below or sucking the glass gobs B neighboring above and below when the glass gobs fall, wherein the gas nozzle 59 rotates in which the center is on falling trajectory of the glass gob B, so that so that the falling trajectories of the glass gobs neighboring above and below are different each other.

The falling trajectories of the glass gobs neighboring above and below are preferably shifted to be different each other by regulating rotational frequency of the trajectory shifting member.

A plurality of the trajectory shifting member are preferably fixedly installed around falling trajectory of the glass gob.

The globular glass manufacturing apparatus may comprise a sensor to detect position of the falling glass gob, the sensor is installed above the trajectory shifting member, and a controller to control timing of gas blow to the glass gob or sucking of the glass gob performed by the trajectory shifting member.

As for the controller, for example, an electromagnetic valve can be given, which switches a valve according to a signal of the sensor so as to blow gas or stop gas blowing, or suck or stop to suck.

The trajectory shifting member may blow gas to one or both of the glass gobs neighboring above and below or sucks one or both of the glass gobs neighboring above and below, while the trajectory shifting member oscillates or reciprocates up and down with respect to falling trajectory of the glass gob.

It is preferable that the trajectory shifting member oscillates up and down within the range under horizontal plane perpendicular to the falling trajectory of the glass gob B, in order that the glass gob whose trajectory has been shifted by air blow or suck does not contact with another glass gob falling from above.

The trajectory shifting member may blow gas to one or both of the glass gobs neighboring above and below or sucks one or both of the glass gobs neighboring above and below, while the trajectory shifting member oscillates or reciprocates in a horizontal direction with respect to falling trajectory of the glass gob, when the glass gobs fall.

The trajectory shifting member is a board or a gutter oscillating or reciprocating up and down with respect to falling trajectory of the glass gob, and the trajectory shifting member flips one or both of the glass gobs neighboring above and below, when the glass gobs fall.

It is preferable that the trajectory shifting member oscillates or reciprocates up and down within the range under horizontal plane perpendicular to the falling trajectory of the glass gob B, in order that the glass gob whose trajectory has been shifted by air blow or suck does not contact with another glass gob falling from above.

It is preferable that an upper surface of the board is planate or concave in order to facilitate it to flip the falling glass gob having globular or approximately globular shape. For the same reason, it is preferable that cross section of the gutter has concave shape on its upper surface that the upper surface is concave. The board or gutter is preferable made of material having heat resistance such as metal. In order to reduce an impact given to the glass gob in flipping, upper surface of the board or gutter is preferably made of a porous material such as a porous metal, and gas may blow from the porous surface of the upper surface of the board or gutter by supplying gas such as air with inside the board or gutter. Further, it is preferable that a cooling pipe is installed to inside or lower face of the board or gutter and it is cooled with gas such as air or liquid such as water in the pipe, in order that the board or gutter is not heated.

The trajectory shifting member is preferably a board oscillating or reciprocating in a horizontal direction with respect to falling trajectory of the glass gob, and the trajectory shifting member flips one or both of the glass gobs neighboring above and below, when the glass gobs fall.

The board can flip the falling glass gob with one or both of vertical faces. The vertical faces are preferably planate in order to facilitate it to flip the glass gob. The board is preferable made of material having heat resistance such as metal. In order to reduce an impact given to the glass gob in flipping, vertical surface of the board flipping the glass gob is preferably made of a porous material such as a porous metal, and gas may blow from the porous surface of the upper surface of the board or gutter by supplying gas such as air with inside the board or gutter. Further, it is preferable that a cooling pipe is installed to inside the board and it is cooled with gas such as air or liquid such as water in the pipe, in order that the board is not heated.

The globular glass manufacturing apparatus may comprise a sensor to detect position of the falling glass gob, the sensor is installed above the trajectory shifting member, and a controller to control timing of gas blow to the glass gob or sucking of the glass gob performed by the trajectory shifting member.

As for the controller, for example, an actuator can be given, which controls oscillation or reciprocation of up and down or oscillation or reciprocation in horizontal direction of the trajectory shifting member according to a signal of the sensor.

The trajectory shifting member may comprise an inclined plane to receive and drop the glass gob, the inclined plane oscillates or rotates in horizontal direction when the glass gobs fall and the inclined plane receives one or both of the glass gobs neighboring above and below while direction of the inclined plane with respect to falling trajectory of the glass gob shifts, so that a trajectory shifting member shifts one or both of falling trajectories of the glass gobs neighboring above and below so that the falling trajectories of the glass gobs neighboring above and below are different each other while the glass gob falls.

For example, the member is a board or gutter installed with inclination, or a triangle pole whose upper surface is inclined. It is preferable that upper surface of the board or triangle pole is planate or convex in order to facilitate it to receive the falling glass gob having a globular or approximately globular shape. For the same reason, it is preferable that the cross section of the gutter has concave shape on its upper surface that the upper surface is concave. The board, gutter or triangle pole is preferable made of material having heat resistance such as metal. In order to reduce an impact given to the glass gob in flipping, upper surface of the board, gutter or triangle pole is preferably made of a porous material such as a porous metal, and gas may blow from the porous surface of the upper surface of the board, gutter or triangle pole by supplying gas such as air with inside the board, gutter or triangle pole. Further, it is preferable that a cooling pipe is installed to inside or lower face of the board, gutter or triangle pole and it is cooled with gas such as air or liquid such as water in the pipe, in order that the board, gutter or triangle pole is not heated.

The globular glass manufacturing apparatus may further comprise a heating and melting member to melt the falling glass gob by heat, installed between the trajectory shifting member and the collection tank.

As for the heating and melting member, for example, a cylindrical fusion furnace or the like can be given.

The flow nozzle may be connected to a lower tip of a pipe which introduces the molten glass.

According to the second aspect of the invention, a manufacturing method of globular glass using the globular glass manufacturing apparatus as claimed in any one of claims 1 to 14, comprises: flowing the molten glass from the flow nozzle in a form of continuous flow, deforming the molten glass flowing in a form of a continuous flow to the droplet-like glass gob during fall, subsequently shifting one or both of falling trajectories of the glass gobs neighboring above and below so that the falling trajectories of the glass gobs neighboring above and below are different each other, and subsequently collecting the glass gob in the collection tank.

In the case that gas blows from a hole of the gas nozzle or the like, the gas is preferably air or inert gas such as nitrogen and argon, or the mixture gas thereof, since they do not affect or merely affect to the glass gob.

For the same reason, in the case that gas blows from the porous surface, the gas is preferably air or inert gas such as nitrogen and argon, or the mixture gas thereof.

In order to prevent the glass gobs neighboring above and below from re-coupling or contacting with each other certainly, it is preferable that the difference of falling trajectory between the glass gobs neighboring above and below is larger than desired diameter of a glass gob.

According to the invention, falling trajectory of one of the glass gobs neighboring above and below is shifted to be different from that of the other glass gobs, so that the falling trajectories become different each other. Thus, re-coupling of two glass gobs into one during fall can be prevented.

As a result, it becomes possible to collect the glass gob without re-coupling, and to manufacture a globular glass having uniform weight and shape. Further, no striae occurs internally.

Further, it becomes possible to prevent the two glass gobs from contacting with each other. Thus, the surface of the glass gob is not damaged.

In earlier development, the falling distance has to be short in order to prevent the glass gobs from re-coupling or contacting with each other during fall. However, in the invention, the falling distance of the droplet-like glass gob can be long. Thus, it becomes possible to collect a globular glass gob at low temperature since it is cooled during fall.

This can also give lower liquid temperature of the collection tank.

According to the invention, for example, the case that gas blows to both of the glass gobs neighboring above and below or both of the glass gobs are sucked is given. In this case, the trajectory shifting member blows gas from a hole to the glass gobs or sucks the glass gobs with the hole while it is rotating in which the center is on the falling trajectory of the droplet-like glass gobs. Firstly, falling trajectory of one of the glass gobs neighboring above and below is shifted. Subsequently, the trajectory shifting member blows gas to the other glass gob or sucks the other glass gob, where the trajectory shifting member has rotary moved to a position different from the first position where it has blown air to or sucked one glass gob. Thus, the falling trajectory of the other glass gob is shifted to a direction different from that of the one glass gob. As described above, falling trajectories the glass gobs neighboring above and below are respectively shifted by air blow or suction of the rotating trajectory shifting member. Thus, re-coupling of two glass gobs into one during fall can be prevented.

According to the invention, falling trajectories of glass gobs are shifted to be different each other by regulating rotational frequency of the trajectory shifting member. Thus, it becomes possible to prevent the two glass gobs neighboring above and below from re-coupling or contacting with each other easily. Further, by regulating rotational frequency of the gas nozzle, falling trajectories of the above one and the other glass gobs can be shifted so that the difference of falling trajectory between them is larger than desired diameter of a glass gob. Thus, it becomes possible to prevent the two glass gobs neighboring above and below from re-coupling or contacting with each other certainly.

According to the invention, falling trajectories of glass gobs can be shifted to be different each other by controlling the timing of blowing of gas or sucking according to a signal of a sensor detecting position of the falling glass gob. Thus, it becomes possible to prevent the two glass gobs neighboring above and below from re-coupling or contacting with each other easily. Further, by controlling the timing as described above, falling trajectories of the above one and the other glass gobs can be shifted so that the difference of falling trajectory between them is larger than desired diameter of a glass gob. Thus, it becomes possible to prevent the two glass gobs neighboring above and below from re-coupling or contacting with each other certainly.

According to the invention, falling trajectories of glass gobs can be shifted to be different each other by controlling the timing of flipping the glass gob according to a signal of a sensor detecting position of the falling glass gob. Thus, it becomes possible to prevent the two glass gobs neighboring above and below from re-coupling or contacting with each other easily. Further, by controlling the above timing, falling trajectories of the above one and the other glass gobs can be shifted so that the difference of falling trajectory between them is larger than diameter of a desired globular glass gob. Thus, it becomes possible to prevent the two glass gobs neighboring above and below from re-coupling or contacting with each other easily.

Figure 7:
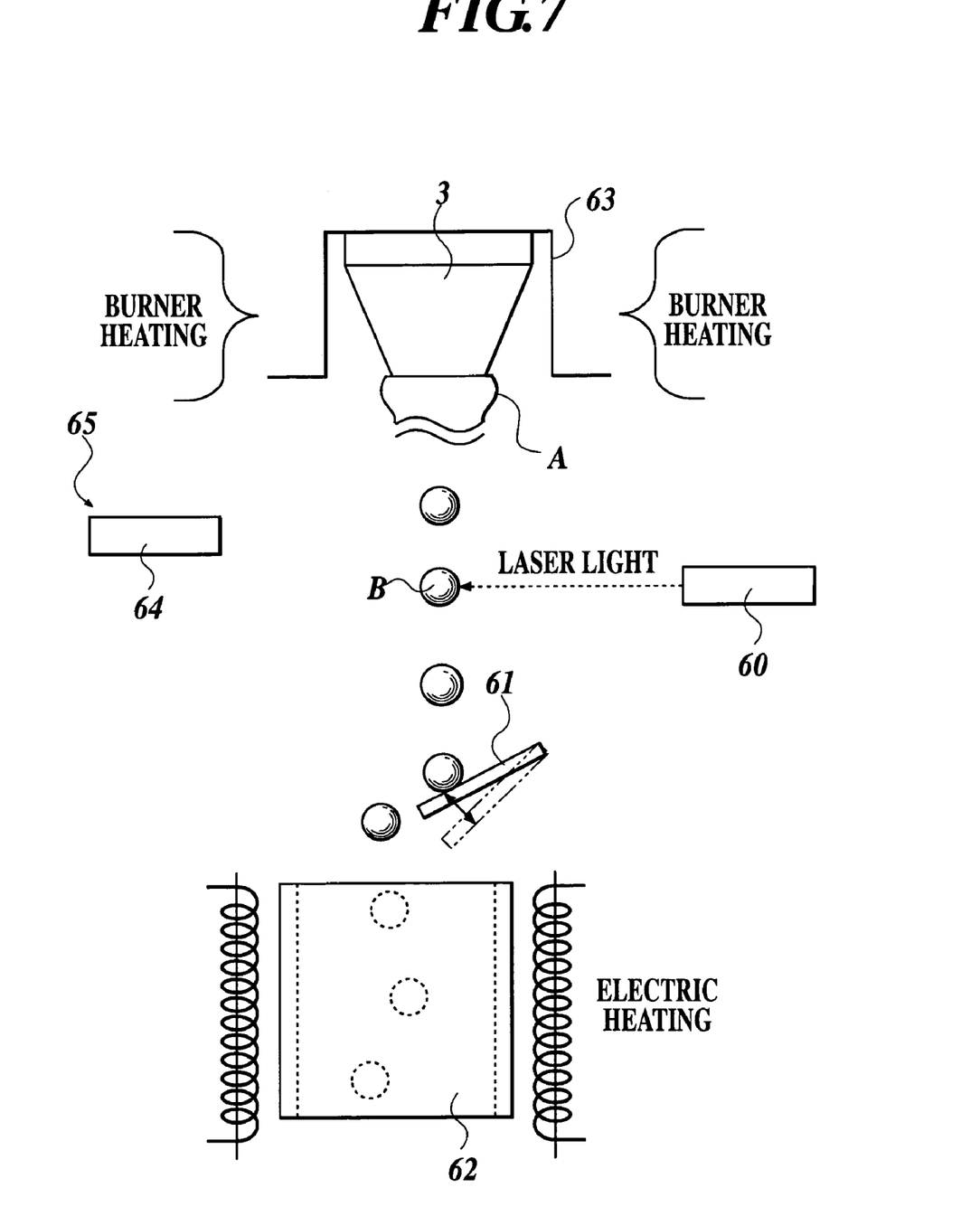
FIG. 7 is a side view schematically showing a main part of the globular glass manufacturing apparatus of embodiment 13 in the present invention.
Figure 8:
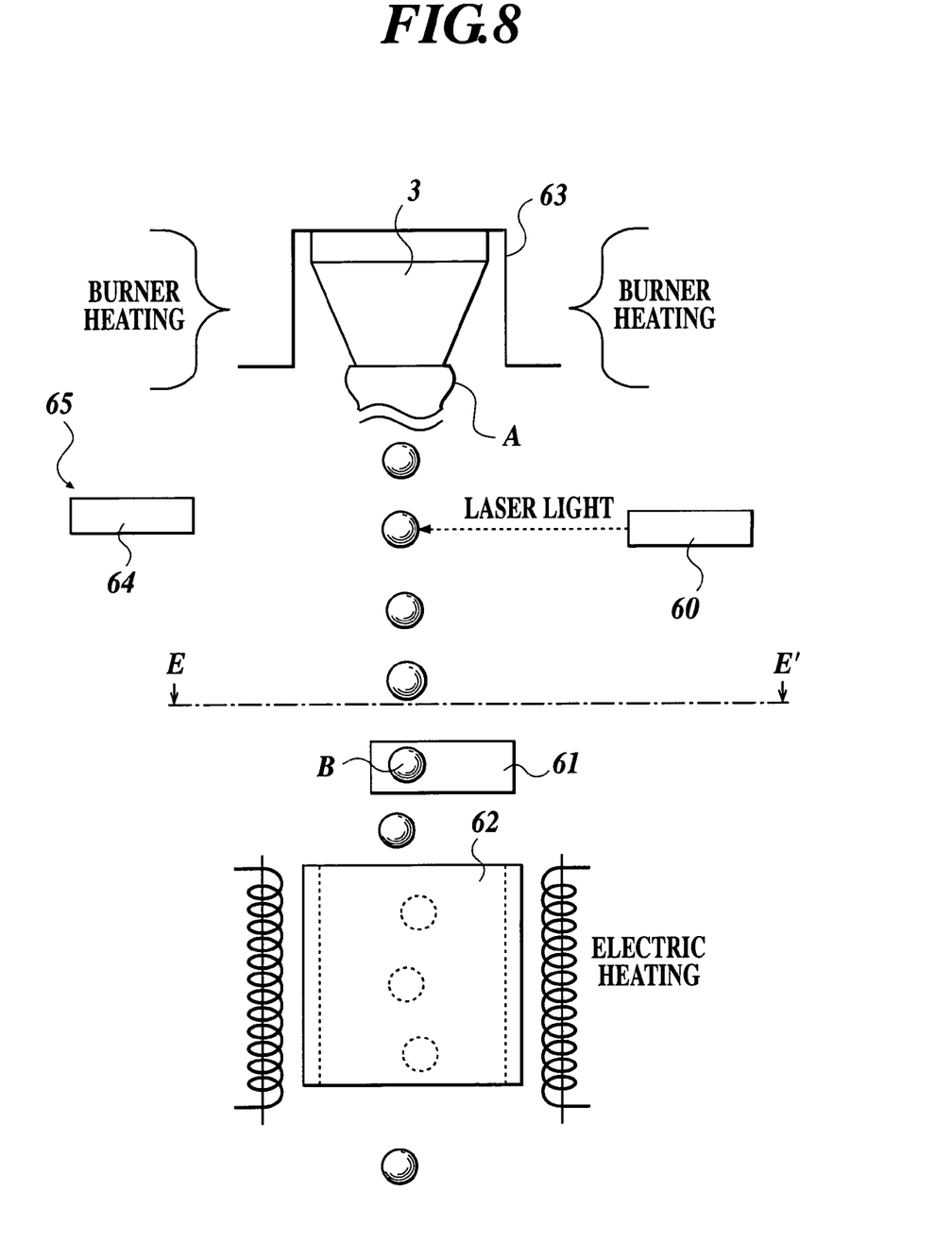
FIG. 8 is a side view schematically showing a main part of the globular glass manufacturing apparatus for showing a modified embodiment of the present invention.
Figure 10:
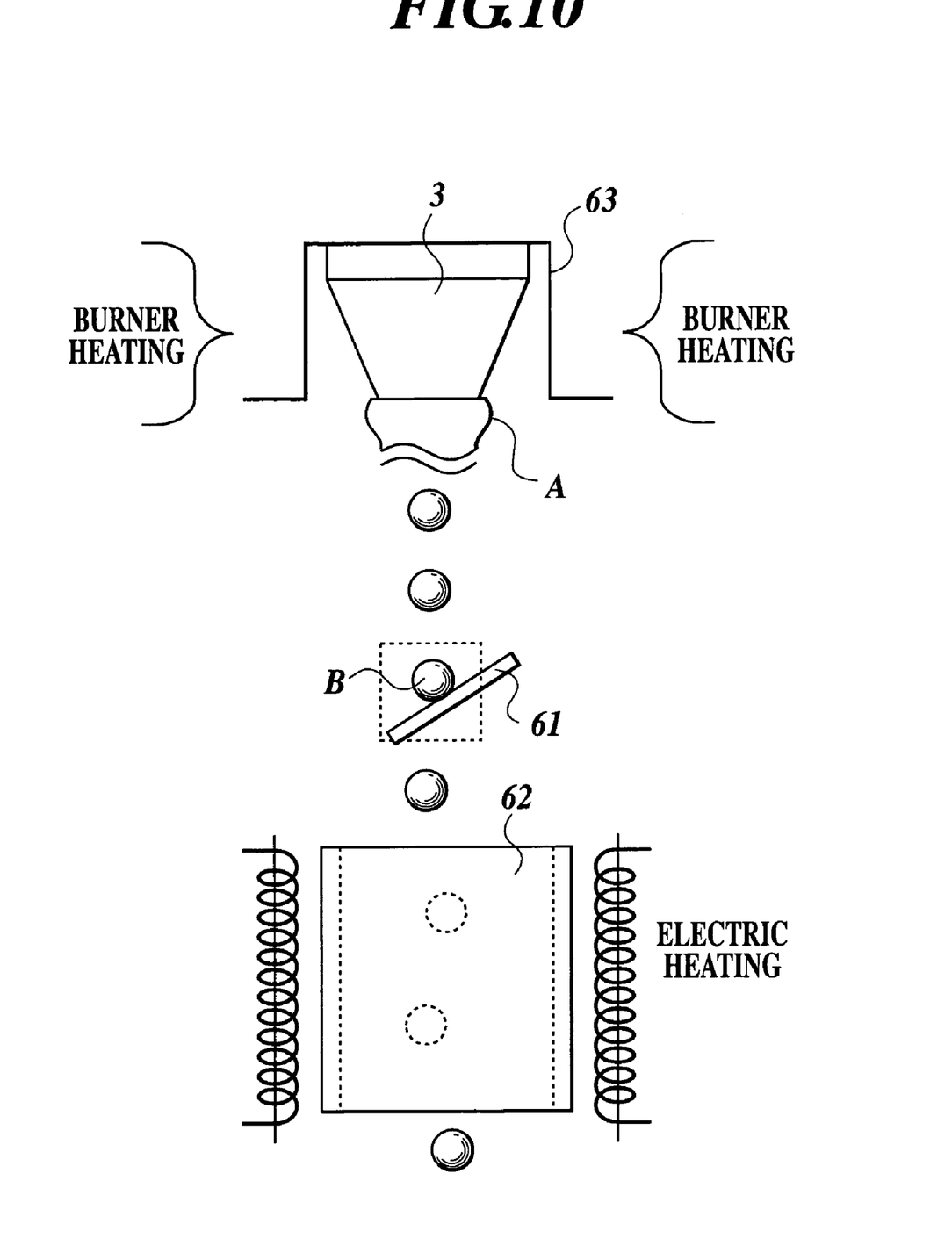
FIG. 10 is a side view schematically showing a main part of the globular glass manufacturing apparatus for showing another embodiment of the present invention.

According to the invention, even when the glass gob is deformed or the surface of the glass gob are damaged when the glass gob is flipped by a board or gutter of the trajectory shifting member or received with the inclined surface of the trajectory shifting member, the flaw on the surface disappears since such glass gob is melted during passing through inside a cylindrical fusion furnace comprising electric heater such as shown in FIG. 7, FIG. 8 and FIG. 10. Further, the glass gob becomes globular thanks to the surface tension thereof during passing through the fusion furnace or during fall after passing through the fusion furnace. Thus, the globular glass having no flaw on the surface thereof can be collected.

According to the invention, introduction of the molten glass to the flow nozzle can be easily stopped by lowering the temperature of the pipe and solidifying the molten glass in the pipe. Thus, the flow nozzle attached on the pipe tip can be exchanged to another flow nozzle having different inner diameter. When the pipe is heated and introduction of the molten glass to the flow nozzle starts again, diameter (weight) of the globular glass obtained by collecting the glass gob can be changed easily at short times as described later. Further, it has high margin of safety because, in an emergency, the flowing of the molten glass from the flow nozzle can be brought to an emergency stop.

BRIEF DESCRIPTION OF THE DRAWINGS

The present invention will become more fully understood from the detailed description given hereinbelow and the appended drawings which given by way of illustration only, and thus are not intended as a definition of the limits of the present invention, and wherein.

PREFERRED EMBODIMENT OF THE PRESENT INVENTION

Hereinafter, the embodiments of the present invention will be explained with reference to the drawings.

Firstly, the constitution of the globular glass manufacturing apparatus of the invention is explained.

FIG. 1 is a sectional side view of the globular glass manufacturing apparatus, showing one of a suitable embodiment of the invention, and FIG. 2 is a sectional side view of the rotation nozzle section.

The rotation nozzle section shown in FIG. 2 is drawn simply in FIG. 1 because of a problem in drawing.

As shown in FIG. 1, the globular glass manufacturing apparatus 1 of the invention comprises a fusion furnace 2 for melting a glass, a flow nozzle 3 for letting molten glass A flow in a form of continuous flow, a pipe 4 which is a path (introduction pipe) of the molten glass A from the fusion furnace 2 to the flow nozzle 3, a rotating nozzle section 5 comprising a gas nozzle 59 for changing falling trajectories of glass gobs B neighboring above and below to be different each other by blowing air while rotating in which a center of the rotation is on the falling trajectory of the glass gobs B which is performed after changing the molten glass A flowing from the flow nozzle 3 into the droplet-like glass gob B, and a collection tank 6 for collecting the glass gobs B.

The fusion furnace 2 comprises a crucible 21 as a container in melting a glass, a furnace body 22 made of a heat-resistance material such as a refractory brick, covering around the crucible 21, a mixer 23 for mixing the molten glass A in the crucible 21, and a heater (not shown).

The crucible 21 is one known in the art, in which a glass can be melt and refined, and which can control a heating to keep the molten glass A at a predetermined temperature.

The mixer 23 is to mix the molten glass A by rotating a mixing blade 24 horizontally so as to homogenize the molten glass A.

The pipe 4 comprises a heater which is not shown, and is capable of controlling the viscosity of the molten glass A and flow rate of the molten glass A in the pipe 4 by controlling a temperature of the pipe 4.

The flow nozzle 3 is conical getting thin toward its tip, and an outlet 3a for flowing the molten glass A is provided at the tip.

Figure 3:
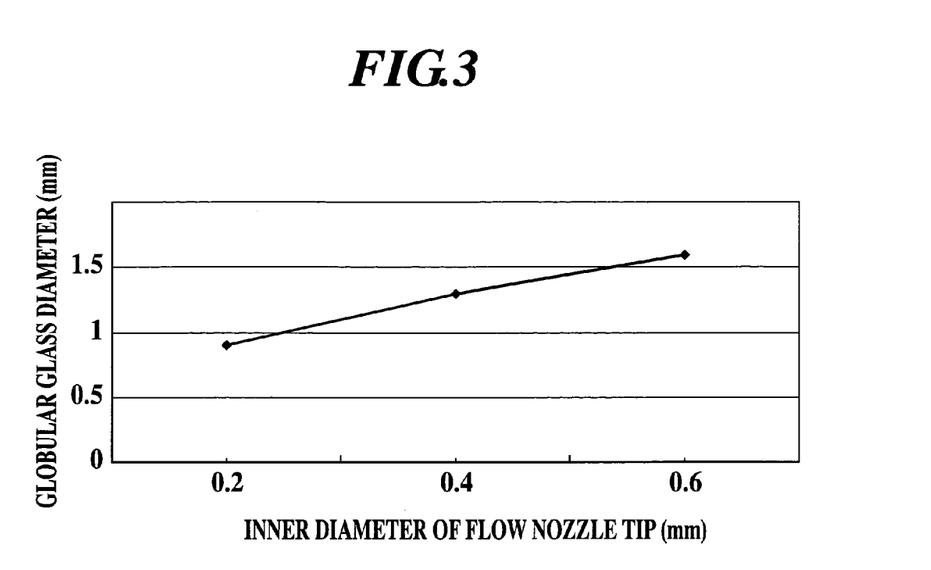
FIG. 3 shows a correlation between inner diameter of a flow nozzle tip and diameter of the globular glass of the globular glass manufacturing apparatus.

The flow nozzle 3 comprises a heater which is not shown, and is capable of controlling the temperature of the flow nozzle 3. Thus viscosity of the molten glass A can be controlled by controlling the temperature of the molten glass A flowing from the tip of the flow nozzle 3. The flow nozzle 3 preferably has, for example, inner diameter of 0.1 to 5.0 mm at the tip thereof. By changing the inner diameter of the flow nozzle 3 at the tip thereof, flow amount and flow rate can be regulated so that particle diameter (weight) of the glass gob B formed by deformation from continuous flow to droplet can be changed. That is, smaller globular glass can be obtained by making the inner diameter of the flow nozzle 3 at the tip thereof smaller. FIG. 3 shows an example of correlation between inner diameter of a flow nozzle tip and diameter of the globular glass obtained in the case that the molten glass A is lanthanum system glass. As shown in FIG. 3, a globular glass of desired diameter can be obtained by changing inner diameter of the flow nozzle 3 at the tip thereof.

The collection tank 6 is filled with water at room temperature. The glass gob B is fallen into water C to absorb the impact and to be cooled, so that the glass gob B is collected as a globular glass.

In order to decrease the temperature difference between the collected glass gob B and the water C so as to reduce an effect due to temperature difference, a heater which is not shown can be provided to inside of the collection tank 6 to heat water in the collection tank 6.

As shown in FIG. 2, the rotation nozzle section 5 comprises a base plate 51, a servomotor 52, a housing 53, a rotation shaft 54, timing pulleys 55, 55, a timing belt 56, a bearing 57, . . . , an air chamber 58, a gas nozzle 59 and the like.

The servomotor 52 and housing 53 are respectively fixed onto and supported with the base plate 51 with nuts 511, 511, bolt 512, . . . , and the like.

The cylindrical rotation shaft 54 is inserted into the cylindrical housing 53, and the droplet-like glass gob B falls through inside the rotation shaft 54.

The rotation shaft 54 is supported with the housing 53 with the bearing 57, . . . provided around the top and bottom of the rotation shaft 54, in which the rotation shaft 54 is rotatable in a circumferential direction of the shaft.

The timing pulleys 55 and 55 are fixed onto upper ends of a motor shaft 52a of the servomotor 52 and rotation shaft 54, and the timing belt 56 extends between these timing pulley 55 and 55. When the servomotor 52 is actuated, rotation of the servomotor 52 is transmitted via the timing belt 56 to the rotation shaft 54.

An air chamber 58 is provided between the rotation shaft 53 and the housing 53, i.e. between bearings 57 and 57 provided above and below.

The air chamber 58 comprises an air supply port 58a communicating to outside via the housing 54, and an air exhaust port 58b in which air is exhausted from the lower end through inside the rotation shaft 54 respectively. An air supply duct connected to air supply source, which is not shown, is attached to the air supply port 58a. The gas nozzle 59 is attached to the air exhaust port 58b.

The gas nozzle 59 attached with a nut 591 is placed on circumferential lower end of the rotation shaft 54 in a state that it extends downward from the lower end and the tip thereof faces to radial direction of the rotation shaft 54. The gas nozzle 59 is conical getting thin toward its tip, and a blowing port 59a for blowing air is provided on the tip.

Air supplied from the air supply source is intaken into the air chamber 58 through the air supply duct and the air supply port 58a. Then the air is blown from the gas nozzle 59 provided to the air exhaust port 58b.

The rotation nozzle section 5 is covered with an upper cover 7a and a lower cover 7b entirely.

Since the rotation nozzle section 5 is constituted as described above, when the servomotor 52 is actuated, the rotation of the servomotor 52 is transmitted to the rotation shaft 54, and the gas nozzle 59 rotates in axial direction (center of the rotation is on falling trajectory of the glass gob B) together with the rotation shaft 54. Thus, the rotating gas nozzle 59 blows air to the glass gob B falling through inside of the rotation shaft 54, so that falling trajectories of the glass gobs neighboring above and below are shifted to be different each other.

Here, in order to shift the falling trajectory of the glass gob B, rotational frequency of the gas nozzle 59 is changed by regulating rotational frequency of the servomotor 52.

In the present invention, it is particularly preferable that the servomotor 52 is regulated and the falling trajectories of the droplet-like glass gobs neighboring above and below are shifted so that the difference between the falling trajectories is more than diameter of the glass gob B.

Further, air blow amount can be can be changed by regulating the tip inner diameter of the gas nozzle 59 or regulating air supply, so that the interval between the glass gobs B neighboring above and below can be changed.

The present embodiment explains the case that air is blown from the gas nozzle 59 to the flowing glass gob B. However, for example, it is also possible that the gas nozzle sucks the glass gob B so that the falling trajectories of the glass gobs neighboring above and below are changed to be different each other. Further, it is also possible that gas nozzle 59 blows inert gas such as nitrogen and argon or the mixture gas thereof, or mixture gas of air and inert gas.

The crucible 21, mixer 23, mixing blade 24, pipe 4, flow nozzle 3 and the like are preferably made of platinum or platinum-alloy on the ground that they resistant to erosion against glass and have a little effect to quality of the molten glass A. However they are not limited thereto.

The flow nozzle 3 is not limited to be conical getting thin toward the tip. For example, various shapes and constitutions known in the art such as a pipe shape and a shape that the nozzle tip is extended to be tapered can be given.

The above heater can be a heater, electric heater, conductive heating element, high-frequency induction heat, and one heated with combustion of gas or the like using burner or the like, which are known in the art. It is preferable that the pipe 4 and flow nozzle 3 can be heated by energizing electricity directly, although they are not limited thereto. When the tip of the flow nozzle 3 is heated with gas combustion using a gas burner or the like as shown in FIGS. 4, 6 to 8 and 10, for example, it is preferable that a cover 63 is provided around the tip of the flow nozzle 3 and the tip is heated from outside of the cover 63 in order to eliminate an effect to an atmosphere around the molten glass flowing from the tip of the flow nozzle 3 and to heat the tip of the flow nozzle as uniform as possible.

The fusion furnace 2 can be a batch type in which a cullet made by melting, quenching to be solidify and crushing a glass material, or a glass material is melted, refined and homogenized in the crucible 21 by rotating the mixing blade 23 to mix, so that the fusion furnace supplies the molten glass A to the flow nozzle 3. Further, the fusion furnace can have a constitution that melted and refined glass can be added continuously to the crucible 21 and the molten glass A homogenized by rotating the mixing blade to mix can be supplied continuously to the flow nozzle 3.

In place of the fusion furnace 2, a glass fusion furnace or a glass mixing container having a constitution or shape known in the art can be used, such that a mixing container made of platinum or platinum-alloy comprises a heat-resistant material covering around the mixing container, a mixer made of platinum or platinum alloy for mixing a molten glass in the mixing container, a heater for keeping the temperature of the molten glass A at a predetermined temperature, melted and refined glass is continuously supplied to the mixing container, and mixed, and homogenized molten glass with the mixer is continuously applied to the flow nozzle 3.

The shape of the mixer 23 and the mixing blade 24 thereof are not especially limited. Any shapes and constitutions known in the art, for example, such as screw shape can be given.

Liquid filled in the collection tank 6 is not limited to water. However, it is preferable to use water in the present invention, because falling distance of the glass gob B can be long and the glass gob B at low temperature can be collected due to heat radiation of the glass gob B. Further, water is preferable because it is extremely low in cost, very easy and safe in handling and has low environmental burden, and the collected glass gob (globular glass) can be dried without wash or after simple wash to use as an optical element such as a preform or lens. When the falling distance is short due to constraint of such as height of the manufacturing apparatus so that the glass gob B is collected at comparatively high temperature, liquid having comparatively high boiling point which is easy in handling and washing after collection can be used for decreasing the temperature difference between the liquid and the falling glass gob B, since liquid can be heated only up to the boiling point thereof.

Next, the manufacturing method of globular glass where the above-described globular glass manufacturing apparatus 1 is used to manufacture a globular glass will be explained with reference to FIG. 1 and FIG. 2.

First, cullet, glass material or the like are put into the crucible 21. The material is heated with a heater, which is not shown, to be melted in the crucible 21 of the fusion furnace 2, so as to obtain the molten glass A. The molten glass A is refined and mixed by rotating the mixer 23 with the mixing blade 24, to homogenize the molten glass A.

Next, the molten glass A is introduced to the flow nozzle 3 through the pipe 4, so that let the molten glass A flow from the flow nozzle 3.

At the flowing, viscosity, flow rate and the like of the molten glass B are controlled by regulating heating temperatures of the fusion furnace 2, pipe 4 and flow nozzle 3, so that the molten glass A flows from the flow nozzle 3 in a form of continuous flow and the continuous flow of the molten glass A is deformed to droplet-like glass gobs B before it reaches the rotation nozzle section 5. Alternatively, the rotation nozzle section 5 which can move up and down is installed at the position where the continuous flow of the molten glass A flown from the flow nozzle 3 is deformed to droplet-like glass gobs B.

As described above, the molten glass A flown from the flow nozzle 3 in a form of continuous flow is deformed to droplet-like glass gobs B falling in a line, before it reaches the rotation nozzle section 5.

Subsequently, the glass falls into the inside of the rotation shaft 54 in a form of the droplet-like glass gob B.

The rotation nozzle 5 blows air for each falling droplet of the glass gobs B while rotating the gas nozzle 59 in axial direction (the center is on the falling trajectory of the glass gob B) together with the rotation shaft 54 by rotating the servomotor 52. This gives that falling trajectory of one of the glass gobs B neighboring above and below is shifted. Subsequently, the gas nozzle 59, which has moved rotary to a position different from that where the gas nozzle 59 has blown air to the above one glass gob B, blows air to the other glass gob B. Thus, falling trajectory of the other glass gob B is changed to be different direction from that of the above one glass gob B. As described above, air is blown from a rotating gas nozzle 59, so that the falling trajectories of the glass gobs B neighboring above and below are shifted to be different from each other. Thus, they are not re-coupled or contacted with each other.

Here, especially by regulating rotational frequency of the gas nozzle 59, falling trajectories of the above one and the other glass gobs B are shifted so that the difference of falling trajectory between them is larger than desired diameter of a glass gob.

The glass gobs B, whose falling trajectories have been shifted by the gas nozzle 59, fall downward to the collection tank 6 and are collected. The glass gobs B collected in the collection tank 6 are obtained to be a globular glass.

Embodiments

Hereinafter, the present invention is explained concretely by the given embodiments. However, the embodiment of the present invention is not limited thereto.

Figure 4:
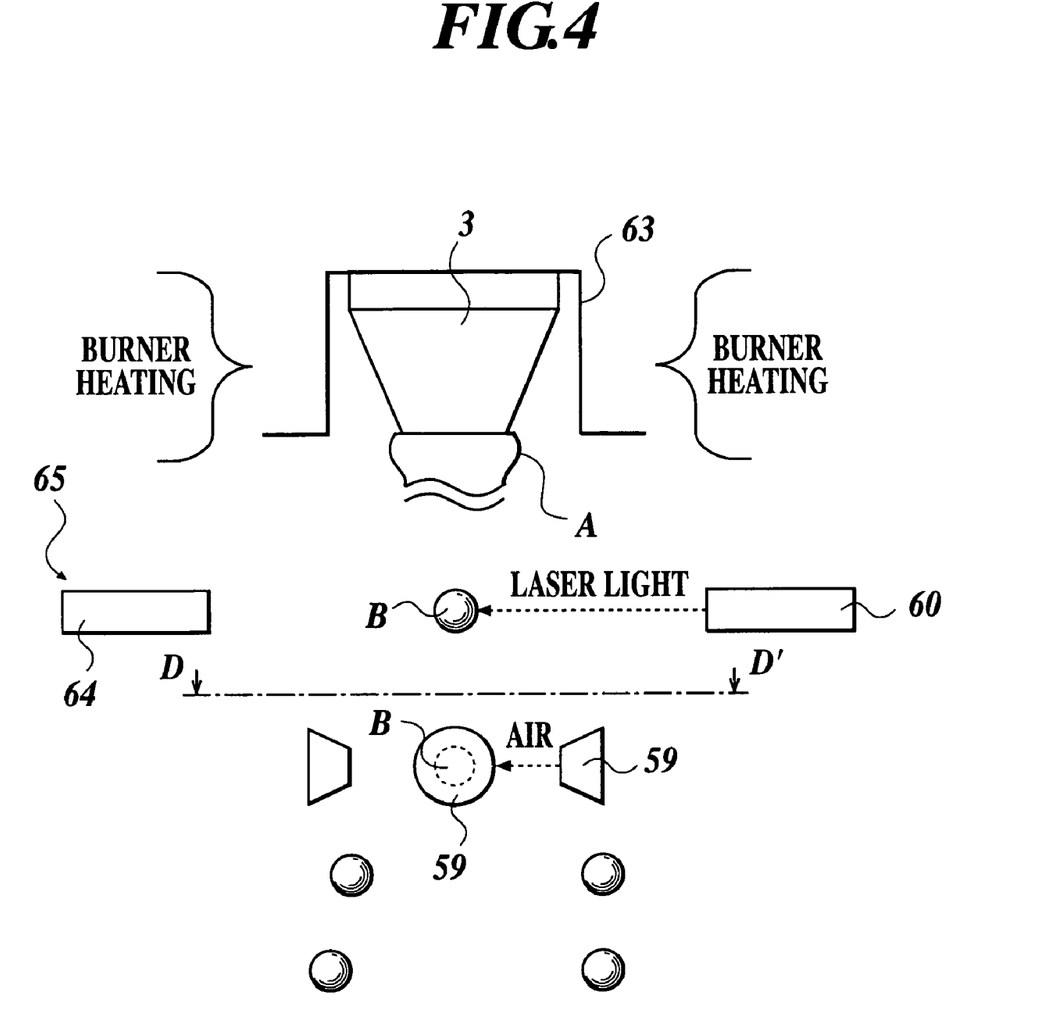
FIG. 4 is a side view schematically showing a main part of the globular glass manufacturing apparatus of embodiment 6 in the present invention.
Figure 5:
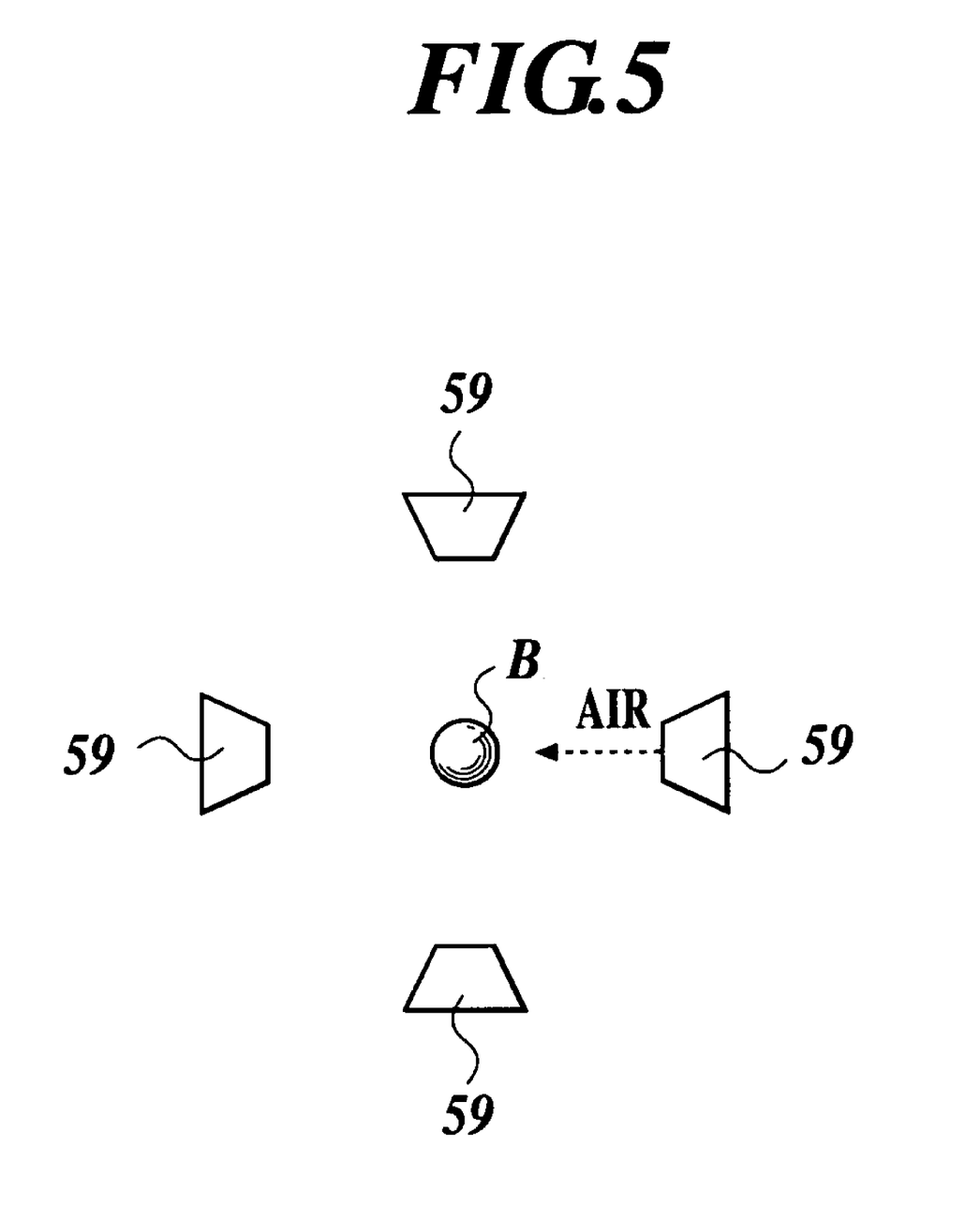
FIG. 5 is a plain view gazing the main part downward from a horizontal plane including the section line D to DI in FIG. 4, schematically showing the main part.
Figure 6:
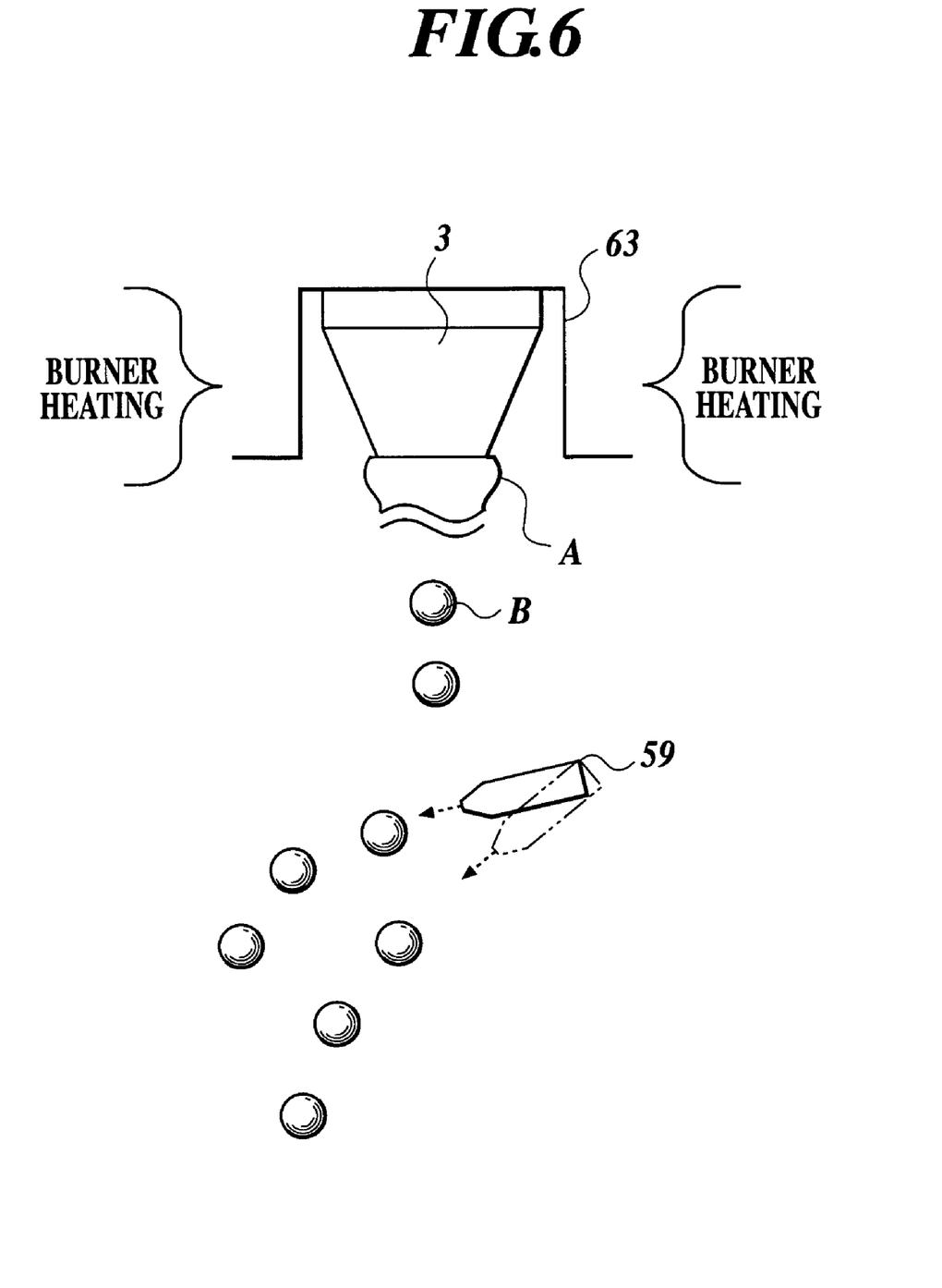
FIG. 6 is a side view schematically showing a main part of the globular glass manufacturing apparatus of embodiment 10 in the present invention.

In the following embodiment 1 to embodiment 5, a globular glass is manufactured by using the above-described globular glass manufacturing apparatus 1 shown in FIG. 1. In comparative example 1 and 2, an apparatus equivalent to the above globular glass manufacturing apparatus 1 except the rotation nozzle section 5 is not provided, and the molten glass A flown from the flow nozzle 3 is deformed to droplet-like glass gob B during fall and is directly collected with the collection tank. As described later, the above glass manufacturing apparatus 1 comprising a section shown in FIG. 4 and FIG. 5 is used in embodiments 6 to 9, the apparatus comprising a section shown in FIG. 6 is used in embodiments 10 to 12, and the apparatus comprising a section shown in FIG. 7 is used in embodiment 13. In each apparatus, the molten glass A flown from the flow nozzle 3 is deformed to the droplet-like glass gobs B during fall, the falling trajectories of the glass gobs are shifted, and they are collected with the collection tank 6.

COMPARATIVE EXAMPLE 1

The temperature of the platinum crucible 21 and flow nozzle 3 were set at 1100° C. and 1080° C. respectively, so that lanthanum system glass (specific gravity 3.24) as the molten glass A flows from the flow nozzle having inner diameter of tip of 0.5 mm at flowing rate of 34.3 g/min. The size of the glass gob B which was deformed from the flown molten glass A during fall was measured. When the glass gobs B were obtained by catching them on the metal plate after their 1 m fall, 100% of the glass gobs B in 1 g sample respectively weighed 5.7 mg. When the glass gobs B were obtained by catching them in the water at room temperature after their 24 m fall, 90% or more of the glass gobs B in 1 g sample respectively weighed 11.4 mg.

Embodiment 1

Under the condition as same as comparative example 1, air was blown at 2.5 L/min using the gas nozzle 59 placed 0.5 m downward from the flow nozzle 3 while the gas nozzle 59 rotates at rotational frequency of 3000 rpm before the droplet-like glass gobs B are collected. 100% of the glass gobs B in 1 g sample collected in water at room temperature after their 24 m fall respectively weighed 5.7 mg.

COMPARATIVE EXAMPLE 2

The temperature of the platinum crucible 21 and flow nozzle 3 were set at 1300° C. and 1255° C. respectively, so that lanthanum system glass (specific gravity 4.49) as the molten glass A flowed from the flow nozzle 3 having inner diameter of the tip of 0.215 mm at flowing rate of 10.6 g/min.

The size of the glass gob B which was deformed from the flown molten glass A during fall was measured. When the glass gobs B were obtained by catching them on the metal plate after their 1 m fall, 100% of the glass gobs B in 1 g sample respectively weighed 1.8 mg. When the glass gobs B were obtained by catching them in the water at room temperature after their 24 m fall,. 90% or more of the glass gobs B in 1 g sample respectively weighed 3.6 mg.

Embodiment 2

Under the condition as same as comparative example 2, air is blown at 2.3 L/min using the gas nozzle 59 rotates placed 0.5 m downward from the flow nozzle 3 while rotating the gas nozzle 59 at rotational frequency of 3000 rpm before the droplet-like glass gobs B are collected. 100% of the glass gobs B in 1 g sample collected in water at room temperature after their 24 m fall respectively weighed 1.8 mg.

Embodiment 3

The conditions were set as same as that in embodiment 2, except the blown gas was nitrogen instead of air. 100% of the collected glass gobs B in 1 g sample respectively weighed 1.8 mg.

Embodiment 4

The conditions were set as same as that in embodiment 1, except the blown gas was argon instead of air. 100% of the collected glass gobs B in 1 g sample weighed respectively 1.8 mg.

Embodiment 5

A globular glass manufacturing apparatus having the same constitution of the globular glass manufacturing apparatus 1 shown in FIG. 1 was used, except the gas nozzle 59 sucks the glass gobs using a vacuum pump which is not shown instead of blowing air from the gas nozzle 59 by supplying air. Except the gas nozzle 59 sucks the glass gobs using a vacuum pump which is not shown instead of blowing air from the gas nozzle 5.9, the conditions were set as same as that in embodiment 2. 100% of the collected glass gobs B in 1 g sample respectively weighed 1.8 mg.

Embodiment 6

A globular glass manufacturing apparatus having same constitution of the globular glass manufacturing apparatus 1 shown in FIG. 1 was used, except the rotation nozzle section 5 was not provided but the section shown in FIG. 4 and FIG. 5 was provided. That is, as shown in FIG. 4 and FIG. 5, a transmission type sensor 65 comprising a light emitting unit 60, a photo detecting unit 64 for detecting laser light is provided. The transmission type sensor 65 detects position of the falling glass gob B and sends out a signal when the glass gob B intercept the laser light. The gas nozzles 59, . . . , which do not rotate, are placed below the transmission type sensor 65 in different 4 directions. The conditions were set as same as that in embodiment 2, except the rotational frequency of the gas nozzle. The position of the falling glass gob B was detected by the transmission type sensor 65. The timing of the air blow from the gas nozzles 59, . . . were controlled by switching an electrical bulb which is not shown according to the detection signal from the transmission type sensor 65, so that the gas nozzles 59, . . . placed different positions from one another blew air toward each of the glass gobs. Thus, the falling trajectories of the falling glass gobs are shifted one by one. 100% of the collected glass gobs in 1 g sample respectively weighed 1.8 mg.

Embodiment 7

The conditions were set as same as that in embodiment 6, except the blown gas is nitrogen instead of air. 100% of collected glass gobs B in 1 g sample respectively weighed 1.8 mg.

Embodiment 8

The conditions were set as same as that in embodiment 6, except the blown gas is argon instead of air. 100% of collected glass gobs B in 1 g sample respectively weighed 1.8 mg.

Embodiment 9

A globular glass manufacturing apparatus having same constitution of the globular glass manufacturing apparatus 1 shown in FIG. 1 was used, except the rotation nozzle section 5 was not provided but the section shown in FIG. 4 and FIG. 5 was provided and the gas nozzle 59 sucks the glass gobs using a vacuum pump which is not shown is stead of air supply and air blow.

Except the gas nozzle 59 sucks the glass gobs B using a vacuum pump which is not shown instead of blowing air from the gas nozzle 59 to the glass gobs B, the conditions were set as same as that in example 6. 100% of the collected glass gobs B in 1 g sample respectively weighed 1.8 mg.

Embodiment 10

A globular glass manufacturing apparatus having same constitution of the globular glass manufacturing apparatus 1 shown in FIG. 1 was used, except the rotation nozzle section 5 was not provided but the section shown in FIG. 6 was provided.

That is, the gas nozzle 59 which oscillates up and down in vertical direction with respect to the falling glass gob B is installed as shown in FIG. 6. Note that the gas nozzle 59 does not rotate. The conditions were set as same as that in embodiment 2 except rotational frequency of the gas nozzle. The gas nozzle 59 blew air while oscillating up and down within the range under horizontal plane perpendicular to the falling trajectory of the glass gob B, so that the falling trajectories of the glass gobs B were shifted one by one. 100% of the collected glass gobs in 1 g sample respectively weighed 1.8 mg.

Embodiment 11

The conditions were set as same as that in embodiment 10, except the blown gas is nitrogen instead of air. 100% of collected glass gobs B in 1 g sample respectively weighed 1.8 mg.

Embodiment 12

The conditions were set as same as that in embodiment 10, except the blown gas is argon instead of air. 100% of collected glass gobs B in 1 g sample respectively weighed 1.8 mg.

Embodiment 13

A globular glass manufacturing apparatus having same constitution of the globular glass manufacturing apparatus 1 shown in FIG. 1 was used, except the rotation nozzle section 5 was not provided but the section shown in FIG. 7 was provided. That is, as shown in FIG. 7, the transmission type laser 65 equivalent to that shown in FIG. 4 is installed, and a metal plate 61 is placed below the transmission type sensor 65, to shift the falling trajectories of the falling glass gobs B by flipping them one by one in vertical direction. The metal plate 61 is placed so that the lower end thereof inclines downward. The metal plate 61 comprises a cooling pipe which is not shown on the lower face thereof so that it is cooled with cooling water flowing in the cooling pipe. A cylindrical fusion furnace 62 is installed below the metal plate 61 for melting the glass gobs B flipped by the metal plate 61 with electric heating. The conditions were set as same as that in embodiment 2, except rotational frequency of the gas nozzle. The transmission type sensor 65 detects the position of the falling glass gob B. The metal plate 61 oscillates up and down within the range under the horizontal plane perpendicular to the falling trajectory of the glass gob B with an actuator working according to the detection signal of the transmission type sensor 65, which is not shown. The timing of the metal plate 61 flipping the glass gob B was controlled so that the glass gobs B were flipped one by one. Subsequently, the flipped glass gob B was melted with electric heating when it passed through inside of the fusion furnace 62. The glass gob B which had passed through the fusion furnace 62 further fell and was collected. 100% of the collected glass gobs in 1 g sample were respectively weighed 1.8 mg.

In comparative example 1, the weight of each glass gob B, which 90% or more of the glass gobs in 1 g sample have, in 24 m fall is twice as much as that in 1 m fall. Therefore, it is found that the glass gobs neighboring above and below re-couple with each other during fall. In comparative example 2, the weight of each glass gob B, which 100% of the glass gobs in 1 g sample have, in 24 m fall is twice as much as that in 1 m fall. Therefore, it is found that the glass gobs neighboring above and below re-couple with each other during fall.

On the other hand, in embodiment 1 to 13, the weight of each glass gob B in 24 m fall is as same as that in 1 m fall in comparative examples 1 and 2. Therefore, it is recognized that the glass gobs B do not re-couple with each other even when the falling distance is long. Further, the weight thereof is small and approximately uniform.

As a result, when air, or nitrogen or argon are blown to the glass gob, the glass gob is sucked, or the movement of the gas nozzle 59, 59 or metal plate 62 oscillating up and down is controlled, so that the falling trajectory is shifted, it becomes possible to prevent the two glass gobs neighboring above and below from re-coupling with each other to be one glass gob. Thus, it can be said that it is possible to manufacture a globular glass having uniform weight and shape. Further, the falling distance of the glass gob B can be long. Thus, the glass gob B at low temperature can be collected since it has been cooled during fall, so that it becomes possible to lower liquid temperature of the collection tank 6.

The present invention is not limited to the above embodiments and can be optionally modified within the sprit and scope of the invention.

Figure 9:
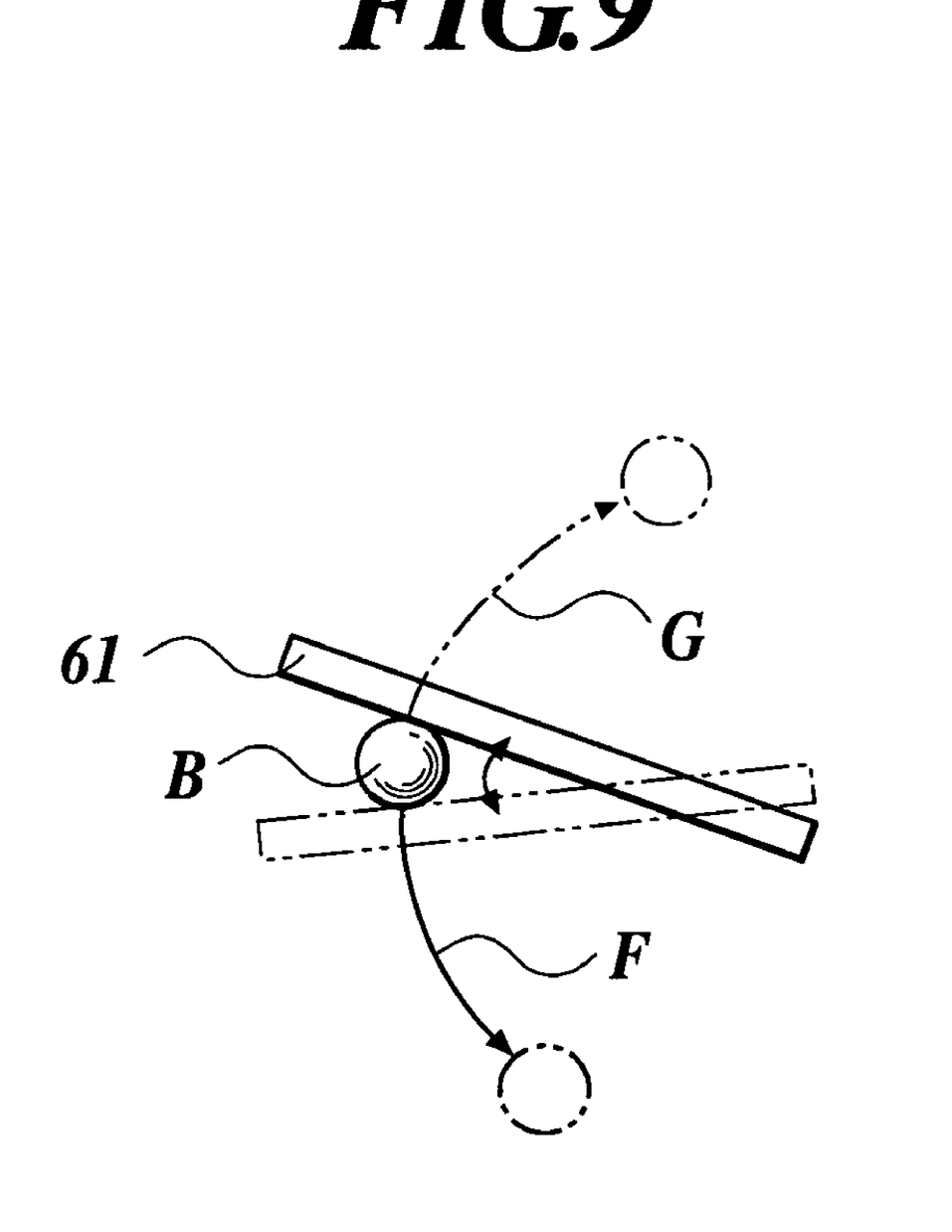
FIG. 9 is a plain view gazing the main part downward from a horizontal plane including the section line E to E' in FIG. 8, schematically showing the main part.

For example, the following can be given as another modification example of the above trajectory shifting member. As shown in FIG. 8 and FIG. 9, the metal plate 61 can oscillate in horizontal direction. In FIG. 9, the arrow F shown in full line shows the shifted falling trajectory of the glass gob B which has been flipped by the metal plate 61 located at the position shown in full line. The arrow G in broken line shows the shifted falling trajectory of the glass gob B which has been flipped by the metal plate 61 shifted at the position shown in broken line. In FIG. 7, the metal plate 61 can reciprocate up and down instead of oscillating. Further, in FIG. 8 and FIG. 9, the metal plate 61 can reciprocate in horizontal direction instead of oscillating in horizontal direction. Further as shown in FIG. 10, the metal plate 61 can be placed with inclination in which the lower end thereof heads downward and it rotates in horizontal direction.

In FIG. 6, the gas nozzle 59 oscillates up and down in vertical direction. The gas nozzle 59 also can reciprocate up and down in vertical direction, or oscillate or reciprocate in horizontal direction.

As for the trajectory shifting member in FIGS. 1, 2 and 4 to 6, it is not limited to the gas nozzle 59, but any member comprising a hole being capable of blowing air or sucking the glass gob can be given.

According to the invention, it is possible to prevent droplet-like glass gobs from re-coupling or contact with each other during fall. Thus, it becomes possible to manufacture a globular glass having uniform weight and shape.

Further, the falling distance of the glass gob can be long. Thus, the glass gob can be collected at low temperature.

Thus, it becomes possible to lower liquid temperature of the collection tank, which enable to collect the glass gob and obtain the globular glass by using liquid such as water, which is extremely low in cost and very easy and safe in handling, has low environmental burden, and it is possible that the collected glass gob (globular glass) can be dried without wash or with simple wash to use as an optical element such as a preform or lens.

According to the invention, falling trajectories of glass gobs are shifted to be different each other by regulating rotational frequency of the trajectory shifting member. Thus, it becomes possible to prevent the two glass gobs neighboring above and below from re-coupling or contacting with each other easily. Especially by regulating rotational frequency, falling trajectories of the above two glass gobs B can be shifted so that the difference of falling trajectory between them is larger than desired diameter of a glass gob. Thus, it becomes possible to prevent the glass gobs neighboring above and below from re-coupling or contacting with each other certainly.

According to the invention, falling trajectories of glass gobs can be shifted to be different each other by controlling the timing of blowing or sucking of gas according to a signal of a sensor detecting position of the falling glass gob. Thus, it becomes possible easily to prevent the two glass gobs neighboring above and below from re-coupling or contacting with each other. Further, by controlling the above timing, falling trajectories of the above one and the other glass gobs can be shifted so that the difference of falling trajectory between them is larger than desired diameter of a glass gob. Thus, it becomes possible to prevent the two glass gobs neighboring above and below from re-coupling or contacting with each other certainly.

According to the invention, falling trajectories of glass gobs can be shifted to be different each other by controlling the timing of flipping the glass gob according to a signal of a sensor detecting position of the falling glass gob. Thus, it becomes possible easily to prevent the two glass gobs neighboring above and below from re-coupling or contacting with each other. Further, by controlling the above timing, falling trajectories of the above one and the other glass gobs can be shifted so that the difference of falling trajectory between them is larger than diameter of a desired globular glass gob. Thus, it becomes possible to prevent the two glass gobs neighboring above and below from re-coupling or contacting with each other easily.

According to the invention, even when the glass gob is deformed or the surface of the glass gob are damaged due to contact with the trajectory shifting member, the flaw on the surface disappears since the glass gob are melted during passing through inside a cylinder of a heating and melting member such as a fusion furnace. Further, the glass gob becomes globular thanks to the surface tension thereof during passing through the cylinder or during fall after passing through the cylinder. Thus, the globular glass having no flaw on the surface thereof can be collected.

According to the invention, introduction of the molten glass to the flow nozzle can easily stop by lowering the temperature of the pipe. Thus, the flow nozzle attached on the pipe tip can be exchanged to another flow nozzle having different inner diameter. When the pipe is heated and introduction of the molten glass to the flow nozzle starts again, diameter of the globular glass obtained by collecting the glass gob can be changed easily at short times. Further, it has high margin of safety because, in an emergency, the flowing of the molten glass from the flow nozzle can be brought to an emergency stop.

The entire disclosure of Japanese Patent Application No.2003-424939 filed on Dec. 22, 2003, including specification, claims, drawings and summary are incorporated herein by reference.

What is claimed is:

1. A globular glass manufacturing apparatus comprising:
a flow nozzle configured to flow molten glass in a form of continuous flow and to let the continuous flow change into droplet-like glass gobs during fall;
a collection tank configured to collect droplet-like glass gobs deformed from the molten glass flowing in a form of continuous flow during fall; and
a trajectory shifting member comprising:
a hole configured to blow gas to one or both of the two neighboring glass gobs or suck one or both of the two neighboring glass gobs, and
a servomotor to rotate the hole with a center on the falling trajectory of the glass gobs so as to blow gas to or suck the two neighboring glass gobs in different directions from each other when the glass gobs fall,
the trajectory shifting member being configured to shift one or both of each two of the glass gobs neighboring above and below after the molten glass changes into the droplet-like glass gobs, and to blow or suck in different directions or different intensities between the two neighboring glass gobs, so that the falling trajectories of the two neighboring glass gobs are different from each other when the glass gobs fall.

2. A globular glass manufacturing apparatus comprising:
a flow nozzle configured to flow molten glass in a form of continuous flow and to let the continuous flow change into droplet-like glass gobs during fall;
a collection tank configured to collect droplet-like glass gobs deformed from the molten glass flowing in a form of continuous flow during fall; and
a trajectory shifting member comprising a hole configured to blow gas to one or both of the two neighboring glass gobs or suck one or both of the two neighboring glass gobs,
the trajectory shifting member being configured to shift one or both of each two of the glass gobs neighboring above and below after the molten glass changes into the droplet-like glass gobs, and to blow or suck in different directions or different intensities between the two neighboring glass gobs so that falling trajectories of the two neighboring glass gobs are different from each other when the glass gobs fall, and
the hole oscillates or reciprocates up and down with respect to the falling trajectory of the glass gob, when the glass gobs fall.

3. A globular glass manufacturing apparatus comprising:
a flow nozzle configured to flow molten glass in a form of continuous flow and to let the continuous flow change into droplet-like glass gobs during fall;
a collection tank configured to collect droplet-like glass gobs deformed from the molten glass flowing in a form of continuous flow during fall; and
a trajectory shifting member comprising a hole configured to blow gas to one or both of the two neighboring glass gobs or suck one or both of the two neighboring glass gobs,
the trajectory shifting member being configured to shift one or both of each two of the glass gobs neighboring above and below after the molten glass changes into the droplet-like glass gobs, and to blow or suck in different directions or different intensities between the two neighboring glass gobs so that falling trajectories of the two neighboring glass gobs are different from each other when the glass gobs fall, and
wherein the hole oscillates or reciprocates in a horizontal direction with respect to the falling trajectory of the glass gob, when the glass gobs fall.

4. The globular glass manufacturing apparatus as claimed in claim 1, wherein a rotational frequency of the hole of the trajectory shifting member is adjustable.

* * * * *